Dec. 17, 1968    G. P. SCHILLER ET AL    3,416,647
ASH DISPOSAL SYSTEM FOR VEHICLES
Filed March 22, 1967    3 Sheets-Sheet 1
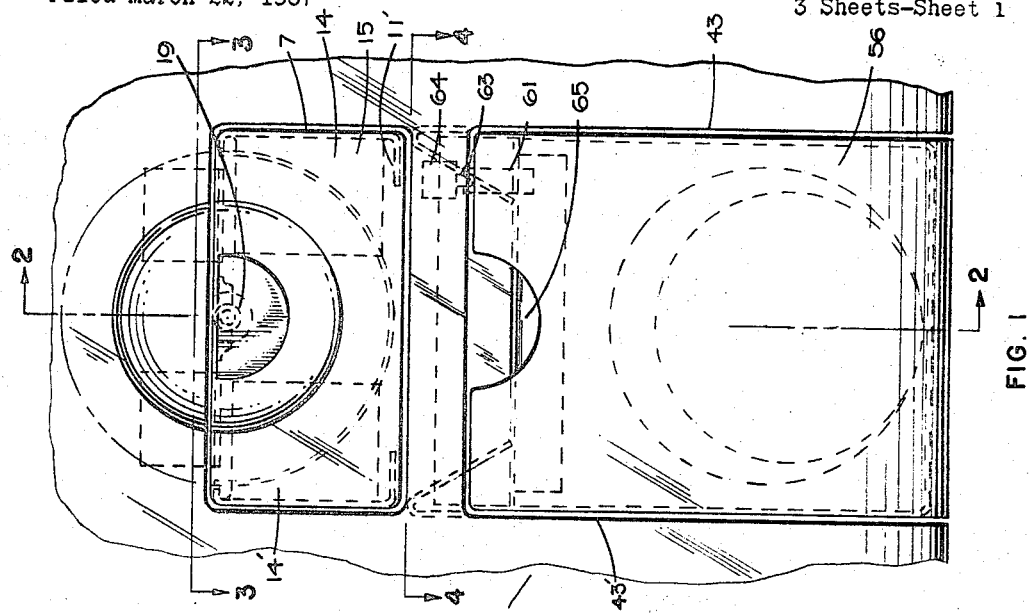
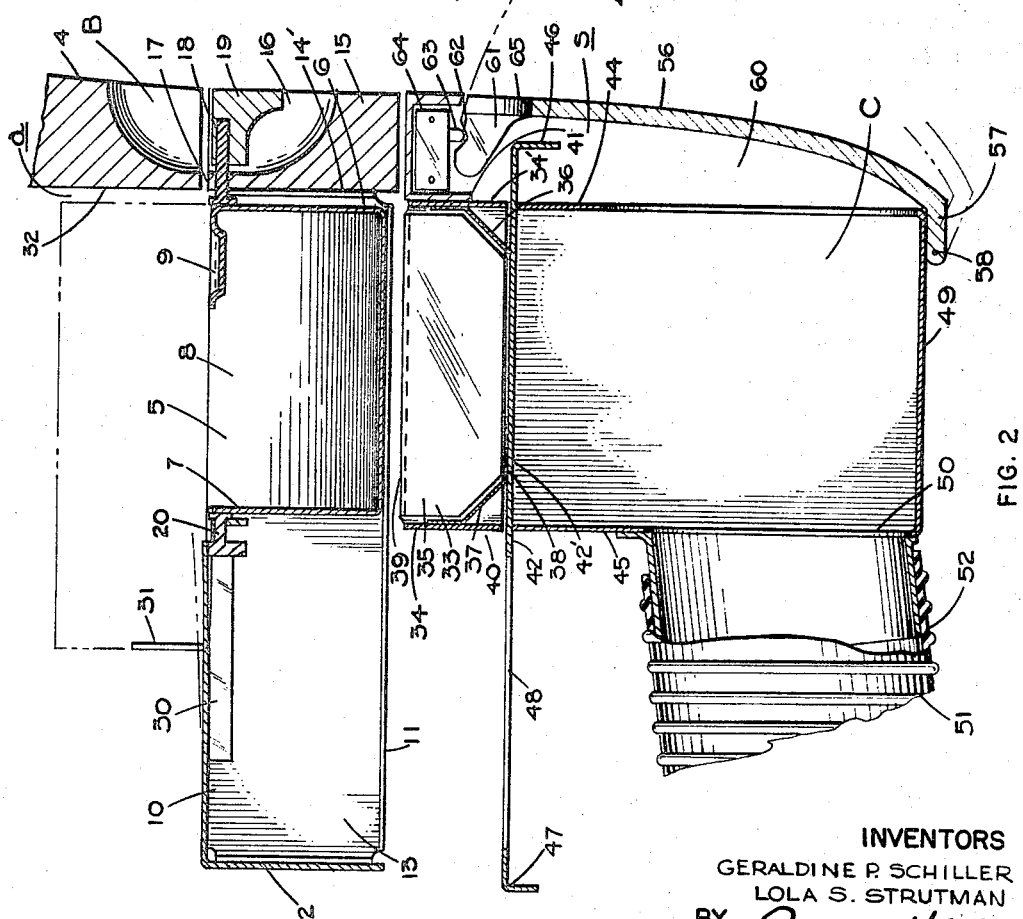
INVENTORS
GERALDINE P. SCHILLER
LOLA S. STRUTMAN
BY *Ralph N. Kalish*
ATTORNEY Dec. 17, 1968   G. P. SCHILLER ETAL   3,416,647
ASH DISPOSAL SYSTEM FOR VEHICLES Filed March 22, 1967   3 Sheets-Sheet 2

INVENTORS
GERALDINE P. SCHILLER
LOLA S. STRUTMAN
BY Ralph W. Kalish
ATTORNEY

Dec. 17, 1968   G. P. SCHILLER ET AL   3,416,647
ASH DISPOSAL SYSTEM FOR VEHICLES
Filed March 22, 1967   3 Sheets-Sheet 3

INVENTORS
GERALDINE P. SCHILLER
LOLA S. STRUTMAN
BY Ralph W. Kalish
ATTORNEY

United States Patent Office 3,416,647
Patented Dec. 17, 1968

3,416,647
ASH DISPOSAL SYSTEM FOR VEHICLES
Geraldine P. Schiller, 233 S. Warson Road, and Lola S. Strutman, 215 S. Warson Road, both of Ladue, Mo. 63124
Filed Mar. 22, 1967, Ser. No. 625,258
7 Claims. (Cl. 206—19.5)

ABSTRACT OF THE DISCLOSURE

An ash tray for disposition between the dashboard and fire wall of a vehicle and adapted for rotation for discharge of its contents into an intermediate collector, with a remote collecting unit located in the engine compartment of the vehicle and connected to said collector by a conduit; there being a vacuum creating device for pulling matter from said collector to said collecting unit.

*Background of the invention*

Heretofore, various devices have been contrived for providing a vacuum-actuated ash tray for automobiles. However, these efforts have been designed primarily for connection to the intake manifold of the vehicle engine rather than incorporate independent power means so that the same may be easily installed and handled in a unitary fashion. Additionally, such prior constructions involve the direct connection of the ash trap to a collecting unit whereby ahes deposited in the ash tray were immediately and automatically pulled to the collecting unit without the exercise of control by the user. Thus, such structures heretofore developed have been intended for constant operation while the vehicle is in running state rather than for operation only at the selected times of use, whether the vehicle is running or not so that a substantial waste in power with consonant unnecessary wear of the components of the devices was caused. The present invention solves the problems encountered with current suction-operated ash trays by presenting a uniquely constructed system which is most economic in fabrication and in use.

*Summary of the invention*

It is an object of the present invention to provide an ash disposal system for installation in a vehicle which incorporates an intermediate ash collector for receiving ash from an ash tray and with novel means for discharge of the material from the collector to a remotely located collecting unit at the option of the user whereby the system is operative only at predetermined junctures.

It is another object of the present invention to provide an ash disposal system of the type stated having unique control means for activating the vacuum system at the option of the user.

It is a further object of the present invention to provide an ash disposal system of the type stated which is of compact design being adapted for obscure mounted disposition forwardly of the vehicle dashboard and having simply-operated and conveniently located control elements.

It is another object of the present invention to provide an ash disposal system of the type stated having a simplicity of parts, with the same being of sturdy construction to conduce to long wearing effectiveness and resistance to breakdown; which system may be most economically manufactured; which system may be easily installed in existing vehicles as well as constituting original equipment; and which system is reliable and durable in usage.

*Brief description of the drawings*

FIGURE 1 is a fragmentary front elevational view of the dashboard of a vehicle having mounted therein an ash disposal system constructed in accordance with and embodying the present invention.

FIGURE 2 is a vertical transverse sectional view taken on the line 2—2 of FIGURE 1.

FIGURE 5 is a transverse sectional view taken substantially on the line 5—5 of FIGURE 3 but showing the ash tray in fully inverted or discharging position.

*Description of the preferred embodiment*

Figure 3:
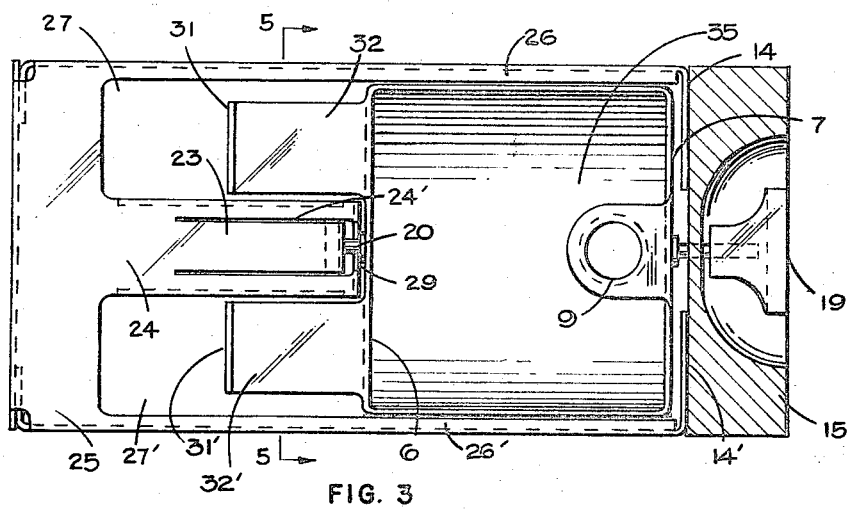
FIGURE 3 is a plan view taken on the line 3—3 of FIGURE 1.

Referring now by reference characters to the drawings which illustrate practical embodiments of the present invention, A generally designates a vehicle (FIGURE 8) having a passenger compartment 1 and an engine compartment 2 with a fire wall 3 therebetween; there being a dashboard 4 located spacedly rearwardly of said fire wall 3. For purposes of orientation herein, rearward will be considered in the direction of the passenger compartment (or toward the right hand side of FIGURE 2), while forward will indicate a direction toward the engine compartment or toward the left hand side of FIGURE 2.

Provided forwardly of dashboard 4 is an ash disposal system generally designated B, which latter incorporates an ash tray or receptacle 5 being fabricated preferably of sheet metal and having front and rear walls 6, 7 of semi-circular configuration; and a semi-cylindrical contoured side wall 8 which is suitably engaged as by welding, rivets, or other like means to said front and rear walls 6, 7; said ash tray 5 being open to the top. There may be integrally formed with rearward wall 7 a snuffer 9 which projects rearwardly from the upper edge thereof. Ash tray 5 is disposed within a drawer 10 having a bottom portion 11, a forward wall 12, and parallel side walls 13, 13' which are spaced outwardly of the adjacent lateral portions of side wall 8 of ash tray 5. Bottom portion 11 is comprised of relatively shallow, rigidifying flanges 11' integral with side walls 13, 13' at their lower ends. Said side walls 13, 13' at their forward ends are turned normally inwardly toward each other to present leafs 14, 14', respectively, which are spaced apart on their vertical free edges, and on their rearwardly directed faces are suitably affixed to the forward face of a decorative panel 15 which conforms to dashboard 4 for constituting a component thereof.

Panel 15, together with the contiguous portions of dashboard 4, is provided with a rearwardly opening, dished recess 16 in the base of which, within panel 15, there is an opening 17 for extension therethrough of a shaft 18, the outer end of which, within recess 16, mounts a handle 19 and the inner end of which is suitably secured to the upper central portion of rearward wall 7 of ash tray 5. Opening 17 thus provides a bearing for shaft 18 so that the latter, upon appropriate manipulation of handle 19, may be rotated about its longitudinal axis for purposes presently appearing. Handle 19 also permits of facile gripping to provide a drawer pull so that drawer 10, together with ash tray 5, may be withdrawn rearwardly for ash reception.

Figure 5:
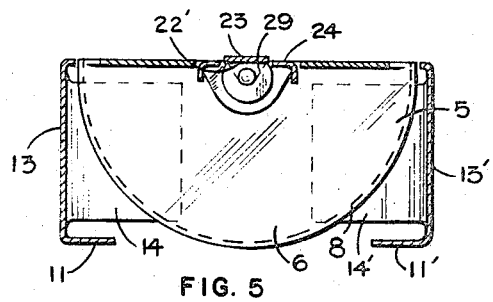
FIGURE 5 is a transverse sectional view taken on the line 5—5 of FIGURE 3.

Rigid with the forward face of front wall 6, in axial alignment with shaft 18, is a short shaft 20 which, at its forward end, carries a cam 21 having an operating edge 22 of approximately 270° in extent, with the ends of said edge being interconnected by a flat peripheral surface 22′ representing the chord of said angle. When ash tray 5 is in upwardly opened condition (FIGURE 2), said peripheral surface 22′ will be directed upwardly (FIGURE 5) for engagement with the under surface of the rearward, free end of a leaf spring 23 which, through its bias, will bear downwardly upon said surface 22. Leaf spring 23 is formed in the central zone 24′ of a top wall member 25 of drawer 10 which may be formed from a single sheet with side walls 13, 13′. Top wall member 25 includes reinforcing lateral flanges 26, 26′ extending the length of said side walls 13, 13′ and is cut-away above ash tray 5 and in transversely, spaced-apart, forwardly extending regions 27, 27′ which are continuous with the space above ash tray 5 and which are separated by tongue portion 24. The rearward end of tongue portion 24 terminates adjacent ash tray front wall 6 whereat it is bent downwardly, as at 28, and provided with an upwardly opening V-shaped notch 29 to provide a bearing for receiving short shaft 20. Tongue portion 24 is reinforced by the depending lateral flanges 30. Drawer 10 is slidingly mounted on conventional runners (not shown) which engage bottom flanges 11′. Thus, it will be seen that upon outward pulling of handle 19, drawer 10 will be caused to travel rearwardly, into the passenger compartment which, with ash tray 5 and dashboard panel 15 moving therewith as a unit. In order to limit the outward travel or withdrawel of drawer 10 there are provided a pair of upstanding detents 31, 31′ formed at the forward end of flat arms 32, 32′ respectively, integral with, and projecting from, forward wall 6 for extension into cutout regions 27, 27′, respectively, on opposite sides of tongue 24. Said detents 31, 31′ will abut against the rearward face of dashboard 4, as at a, for inhibiting further withdrawal of drawer 10. Upon such abutment drawer 10 will be fully extended for convenient reception of ash and related waste particles within ash tray 5. Upon completion of the deposit of ash and the like, the user will then push handle 19 forwardly to return drawer 10 to closed condition.

Presented below drawer 10, and in alignment with ash tray 5, is a collector 33, being preferably formed of sheet metal and being opened to the top, having front and rear walls 34, 34′ and side walls 35, 35′, all of which latter in their lower portions are inclined inwardly and downwardly as at 36, 37, respectively, so that the lower margins of said walls define a bottom opening 38 of relatively less extent than the open upper end 39 of said collector 33. Collector 33 is supported in operative position by suitable securement to front and rear mounting panels 40, 41 depending from convenient points on the vehicle body (not shown). The lower open end 38 of collector 33 is normally maintained in closed condition by the rearward solid portion 42′ of a slide plate 42 disposed therebeneath and adapted for sliding movement in a path normal to the vertical axis of said collector 33; said slide plate 42 being supported for travel upon the upper edges of the parallel sides 43, 43′ and front and rear walls 44, 45, respectively, of a vertically presented, relatively large conduit C located beneath collector 33, with the upper end of said conduit being thus normally closed by the rearward portion 42′ of slide plate 42.

Figure 4:
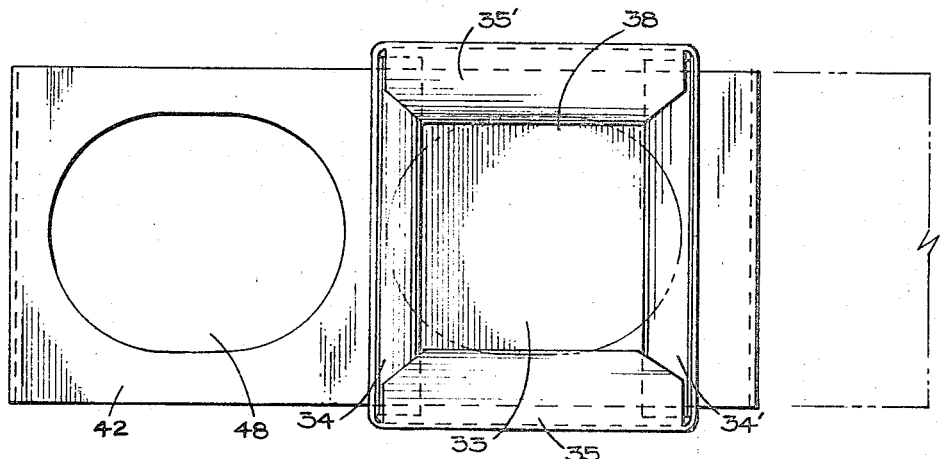
FIGURE 4 is a plan view taken on the line 4—4 of FIGURE 1.

Slide plate 42 is of such longitudinal extent that when the same is disposed for occluding open end 38 of collector 33 and also the upper end of conduit C, the rearward end extremity thereof will project beyond rearward wall 34 of collector 33 and into the space s beneath dashboard panel 15; said extremity being turned downwardly in flange formation, as at 46, to provide a convenient grip. Slide plate 42 normally projects forwardly of forward wall 34 of collector 33 to a point substantially aligned with, or extending slightly beyond, the rearward edge of drawer 10 and with the forward end extremity being downwardly bent, as at 47, to present a detent for abutment against the rear face of forward wall 45 of conduit C for limiting the rearward travel of said plate 42. Provided within the forward portion of slide plate 42 is an enlarged opening 48, of at least like area as collector bottom opening 38, so that when said plate 42 is moved into rearward position, as indicated in phantom lines in FIGURE 4, the said opening 48 will be aligned with the open lower end 38 of collector 33 for effecting communication between the interior of collector 33 and conduit C for purposes to be described below. Accordingly, slide plate 42 is adapted for travel in a direction parallel to that of drawer 10, and when in rearwardly extended position, opening 48 therein will be presented beneath collector 33 and when in forward position, portion 42′ of said plate 42 will define the lower end of collector 33 and coact with walls 34, 34′, 35, 35′ thereof to render same capable of content retention.

Figure 8:
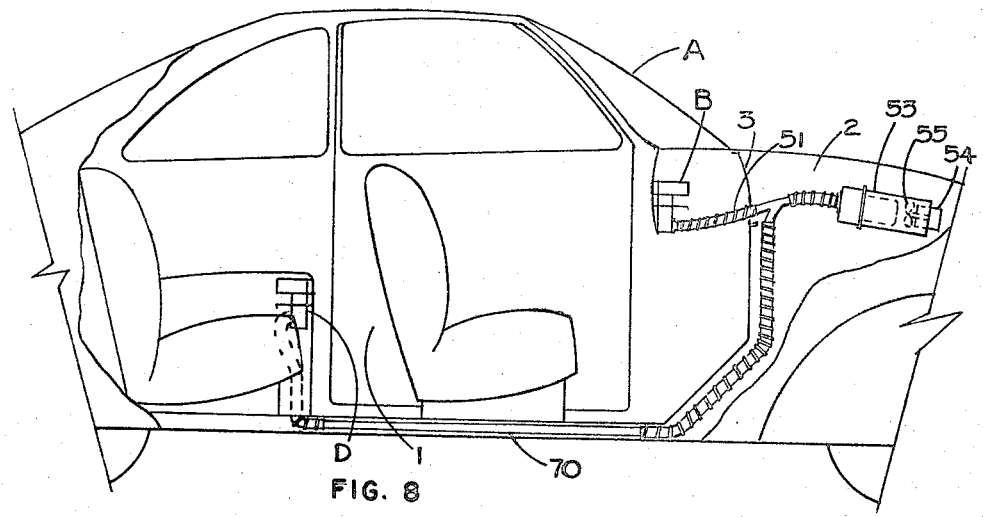
FIGURE 8 is an interior view of a vehicle having installed therein an ash disposal system of the present invention.

Conduit C incorporates a bottom wall 49 which is joined to the lower ends of walls 43, 43′, 44 and 45 and is thus closed or open at its upper end depending upon the particular position of slide plate 42. Forward wall 45, in its lower portion, contains opening 50 for communication with a flexible pipe 51, there being a suitable connector or fitting 52. As shown in FIGURE 8, pipe 51 progresses forwardly through an opening in fire wall 3 for extension into engine compartment 2 where it is engaged to a collecting unit 53 which incorporates a motor 54 and an impeller 55 through operation of which a suction is created for the purpose of drawing matter within conduit C through pipe 51 for deposit within collecting unit 53. Motor 54 is connected to the battery of the vehicle for power purposes.

Presented forwardly of support panel 41 and rearward wall 44 of conduit C is a panel 56, the exterior face of which is finished for agreement with that of dashboard 4 for aesthetic purposes, and which, at its lower end, mounts a forwardly projecting box 57 for engaging a pivot rod 58 suitably secured at its ends in adjacent portions of the vehicle body whereby panel 56 may be rockable thereabout for swinging between upward or closed position (see solid lines in FIGURE 2), and downward or open position (see phantom lines in FIGURE 2). The upper edge of panel 56 terminates downwardly of panel 15 and rearwardly of the central rearward portion of collector 33, there being a transversely extending trim member 59 presented between said panels 56 and 15. As shown in FIGURE 1, panel 56 is of such width as to normally hide conduit C and collector 33. The rearward end of slide plate 42, when in rearward position, is located in the spacing 60 defined by the forward face of panel 56 and rearward wall 44 of conduit C.

Projecting rearwardly from one side edge of panel 56 is a cam 61 having an indentation 62 in its upper operatting surface for coaction with the stem 63 of a normally open switch 64 mounted within the upper portion of spacing 60. Centrally of its upper edge panel 56 is formed to provide an upwardly opening recess 65 to constitute a convenient edge surface for downward pulling upon said panel 56 to swing same about its pivot axis 58 for opening and simultaneously causing switch 64 to be closed by upward movement of stem 63 through action of cam 61. Upon opening or downward movement of panel 56, there will be exposed an opening 66 in rear wall 44 of conduit C.

Switch 64 is in circuit through the vehicle battery with motor 54 whereby upon opening of panel 56, motor 54 will be energized for creating a vacuum, through action of impeller 55, within the system for pulling ashes, litter, debris and the like within conduit C as well as within the interior of the vehicle by reason of opening 66 for removal to collecting unit 53 for maintaining the vehicle interior in a clean state. With motor 54 thus operating and a suction being created, the user may then pull outwardly upon slide plate 42 to align openings 48 and 38 so that the contents of collector 33 may drop downwardly into conduit C for subjection to the suction therein for withdrawal through pipe 51. In this connection, it must be observed that the lower edges of the inclined portions 37, 38 of walls 34, 34' and 35, 35' of collector 33 are in such intimate engagement with the upper face of slide plate 42 that a scraping action is developed therebetween which prevents unauthorized displacement of the contents of collector 33 beyond its confines. Upon emptying of collector 33, and after withdrawal of the same into pipe 51, the user need merely rock panel 56 forwardly, into closed condition, to cause cam 61 to force switch stem 63 into "off" position, thereby breaking the circuit with immediate cessation of operation of motor 54 and termination of the vacuum. Such return swinging of panel 56 also brings about a return movement of slide plate 42 with the rearward flange 46 thereof being accessible through recess 65 if further rearward movement is desired to assure appropriate closure of the lower end of collector 33.

Figure 6:
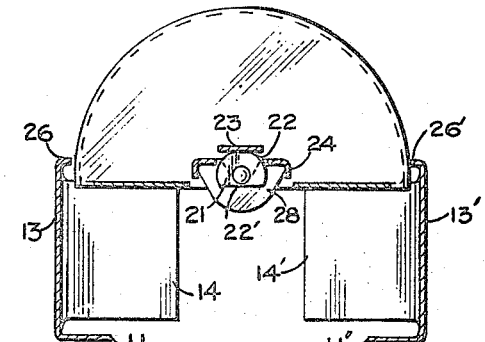

Ash tray 5 at any interval selected by the user may, through applying a torque upon handle 19, be rotated about the axis created by shafts 18, 20 and into inverted position for discharge of the contents into collector 33. By such action the arcuate operating edge 22 of cam 21 will move against the bias of leaf spring 23 forcing same upwardly (FIGURE 6) so that the latter will tend to stabilize ash tray 5 in inverted position to assure of emptying. Upon completion of the discharge of the contents of ash tray 5, handle 19 is turned in either direction to return ash tray 5 to upright, operative position wherein through coaction of leaf spring 23 and cam surface 22' the said ash tray 5 will be maintained for receiving purposes.

It is apparent that ash tray 5 may be preserved in an empty or clean state by the aforesaid action which obviates the necessity of effecting a complete removal of the ash tray for dumping of the contents at a point remote from the vehicle, which procedure is requisite with current vehicular ash trays.

The interposition of collector 33 between ash tray 5 and conduit C provides a safety factor of great substance against a fire. It should be further noted that ash tray 5 and collector 33 jointly constitute a repository for ashes and the like of relatively extensive volume so that the same may hold a substantial quantity of matter before it is necessary to energize motor 54. Accordingly, only infrequent periodic operation of motor 54 is requisite thereby assuring of avoiding wasteful usage of power with consequent unproductive wear of the components.

In view of the foregoing it will observed that with panel 56 in downward or open swung position, with motor 54 operating, the suction created will act only upon the vehicular interior, through opening 66, until such time as the user pulls slide plate 42 rearwardly to thus effect communication between collector 33 and conduit C, whereupon the suction will thus act upon the interior of collector 33. In this state ash tray 5 may be in either inverted or upright condition without affecting the operation of the system. However, with the vacuum created, the user may desire to rotate ash tray 5 so as to subject any contents therein to the impeller created suction. Accordingly, the operation of slide plate 42 will allow a degree of selectivity to the user as to the volumes subjected to the suction. Immediately upon closing of panel 56 the circuit to motor 54 is opened and thus the operation of the latter is terminated pending subsequent energization.

As indicated in FIGURE 8, if desired, vehicle A may be equipped with a similar collecting unit indicated generally D for utilization by passengers riding in the rear seat. Said unit D, which incorporates a rotatable ash tray 5, drawer 10, collector 33, slide plate 42, and conduit C, is connected to remote collecting unit 53 by a pipe 70 which joins pipe 51 proximate said collecting unit 53.

Figure 7:
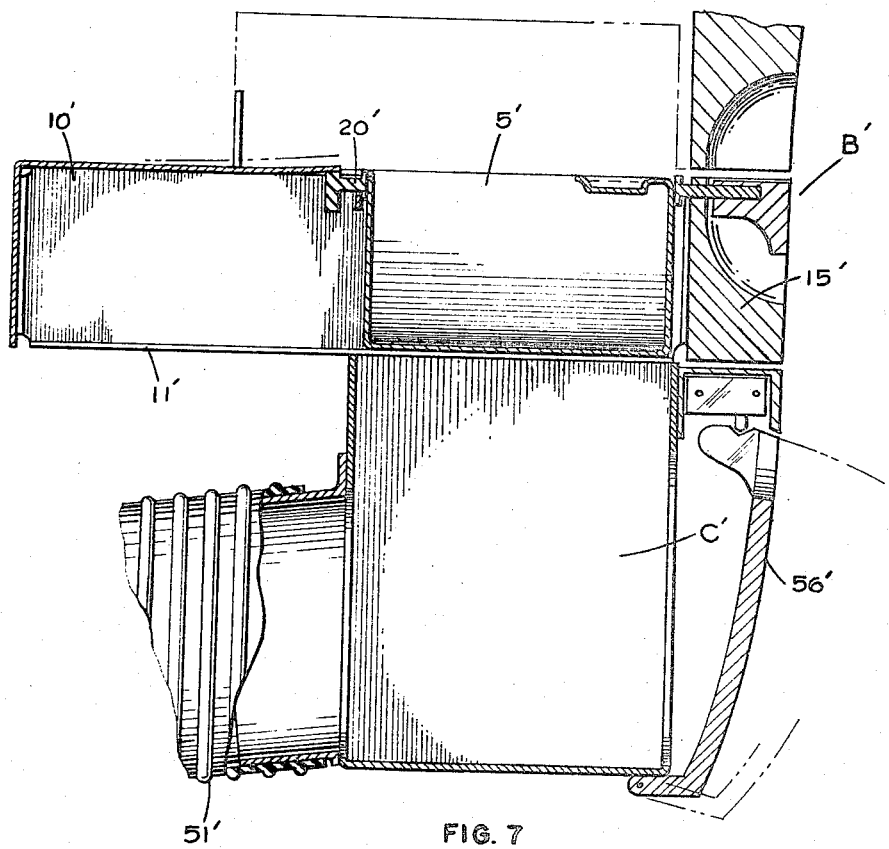
FIGURE 7 is a vertical transverse sectional view taken substantially on the line 2—2 of FIGURE 1, but illustrating another form of the present invention.

Referring now to FIGURE 7, an ash tray disposal system B' may be provided, if desired, which incorporates an ash tray 5' of semi-cylindrical form, mounted for rotation within a drawer 10', a conduit C', panels 15', 56', and a flexible pipe 51', all of which components are substantially of identical construction to the corresponding components of system B hereinabove described. However, system B' differs from system B in that the same does not incorporate an intermediate collector 33 so that when inverted ash tray 5' will discharge its contents directly into conduit C'.

It should be understood that changes and modifications in the formation, construction, arrangement, and combination of the several parts of the Ash Disposal System for Vehicles may be made and substituted for these herein shown and described without departing from the nature and principle of our invention.

Having thus described our invention, what we desire to obtain by Letters Patent and claim is:

1. An ash disposal system for vehicles comprising an ash receptacle having end walls, side walls and a bottom wall, said ash receptacle having an opening to the top, an open-topped drawer, means for slideably supporting said drawer for movement in a horizontal plane, said ash receptacle being mounted in said drawer for movement therewith, said drawer having an opening beneath said ash receptacle, means for rotating said ash receptacle between upward or ash-receiving position and inverted or ash-discharging position in which latter position the open top of said ash receptacle will be in substantial registration with the drawer opening, a conduit disposed spacedly below said drawer and being open at its upper end for alignment with said drawer opening, an ash collector presented between said drawer and said conduit and being open at its upper and lower ends for registration with the drawer opening and the upper open end of said conduit respectively, a closure slideably disposed between the lower open end of said ash collector and the upper open end of said conduit for optionally closing the lower end of said ash collector, an ash depository located remotely of said conduit, means effecting communication between said conduit and said ash depository, and vacuum-creating means for effecting withdrawal of matter discharged into said conduit to said ash depository.

2. An ash disposal system as defined in claim 1 and further characterized by a switch for controlling said vacuum-creating means, said conduit having a lateral opening, a swingably mounted closure for said conduit lateral said switch so that when said closure is in open position opening, and means provided on said closure for engaging said switch will be actuated.

3. An ash disposal system as defined in claim 2 and further characterized by said slideable closure being presented inwardly of said conduit lateral opening closure so that when the latter is in closed condition said slideable closure will be maintained in closed relationship to the lower end of said ash collector.

4. An ash disposal system as defined in claim 1 and further characterized by said slideable closure comprising a plate having an opening in its normally interior end portion so that when said plate is in inward position, the same will close the lower open end of said ash collector and when in withdrawn position, will present its opening in aligment with the lower open end of said ash collector so as to develop communication between the latter and the conduit.

5. An ash disposal system as defined in claim 3 and further characterized by means for preventing movement of said plate when said vacuum-creating means is inactive.

6. An ash disposal system as defined in claim 1 and further characterized by said ash collector having side and end walls tapering inwardly and downwardly for directing ash discharged from said receptacle into said conduit.

7. An ash disposal system as defined in claim 1 and further characterized by said means for rotating said ash receptable comprising a shaft engaged to one end wall of said receptacle, a bearing provided on said drawer for said shaft, a cam carried on said shaft and having an arcuate operating edge and a flat edge, a leaf spring mounted on said drawer in overlying relationship to said cam and being urged downwardly for normal engagement against said cam flat edge whereby when said ash receptacle is rotated into ash-discharging position, said operating edge will engage said leaf spring to force same upwardly against the bias thereof for stabilizing said receptacle in said ash-discharging position.

References Cited

UNITED STATES PATENTS

| | | |
|---|---|---|
| 2,435,687 | 2/1948 | Latin. |
| 2,559,178 | 7/1951 | Thompson. |
| 2,764,281 | 9/1956 | Mendenhall. |
| 2,825,446 | 3/1958 | McDonald. |
| 2,874,702 | 2/1959 | Walker. |
| 3,010,662 | 11/1961 | Johnson. |
| 3,169,636 | 2/1965 | Webber. |
| 1,989,938 | 2/1935 | Marbach. |

THERON E. CONDON, *Primary Examiner.*

U.S. Cl. X.R.

220—20.5